(12) United States Patent
Murphy et al.

(10) Patent No.: US 8,814,693 B2
(45) Date of Patent: Aug. 26, 2014

(54) AVATARS OF FRIENDS AS NON-PLAYER-CHARACTERS

(75) Inventors: Brian Scott Murphy, Seattle, WA (US); Stephen G. Latta, Seattle, WA (US); Darren Alexander Bennett, Seattle, WA (US); Kevin Geisner, Mercer Island, WA (US); Shawn C. Wright, Sammamish, WA (US); Relja Markovic, Seattle, WA (US); Joel B. Deaguero, Snohomish, WA (US); Christopher H. Willoughby, Kenmore, WA (US); Ryan Lucas Hastings, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 534 days.

(21) Appl. No.: 13/117,862

(22) Filed: May 27, 2011

(65) Prior Publication Data
US 2012/0302351 A1 Nov. 29, 2012

(51) Int. Cl.
*A63F 9/24* (2006.01)
*A63F 13/12* (2006.01)
(52) U.S. Cl.
CPC .......... *A63F 13/12* (2013.01); *A63F 2300/807* (2013.01); *A63F 2300/50* (2013.01)
USPC .............................. 463/42; 463/43
(58) Field of Classification Search
CPC ... A63F 13/10; A63F 13/12; A63F 2300/807; A63F 2300/50
USPC ...................................... 463/42, 43
See application file for complete search history.

(56) References Cited

U.S. PATENT DOCUMENTS

| 5,926,179 A | 7/1999 | Matsuda et al. |
| 6,758,754 B1 | 7/2004 | Lavanchy et al. |

(Continued)

FOREIGN PATENT DOCUMENTS

| JP | 2004064398 | 2/2004 |
| JP | 2006141702 | 6/2006 |

(Continued)

OTHER PUBLICATIONS

"Non-Final Office Action", U.S. Appl. No. 13/366,046, (Dec. 21, 2012), 9 pages.

(Continued)

*Primary Examiner* — Michael Cuff
(74) *Attorney, Agent, or Firm* — Micah Goldsmith; Glen Johnson; Wolfe-SBMC

(57) ABSTRACT

In accordance with one or more aspects, for a particular user one or more other users associated with that particular user are identified based on a social graph of that particular user. An avatar of at least one of the other users is obtained and included as a non-player-character in a game being played by that particular user. The particular user can provide requests to interact with the avatar of the second user (e.g., calling out the name of the second user, tapping the avatar of the second user on the shoulder, etc.), these requests being invitations for the second user to join in a game with the first user. An indication of such an invitation is presented to the second user, which can, for example, accept the invitation to join in a game with the first user.

20 Claims, 6 Drawing Sheets

(56) References Cited

U.S. PATENT DOCUMENTS

| | | | |
|---|---|---|---|
| 7,824,253 | B2 | 11/2010 | Thompson et al. |
| 7,903,109 | B2 | 3/2011 | Rurin |
| 7,979,574 | B2 | 7/2011 | Gillo et al. |
| 8,328,639 | B2 * | 12/2012 | Nickell et al. ............ 463/42 |
| 8,562,440 | B2 * | 10/2013 | Nickell et al. ............ 463/42 |
| 2002/0086730 | A1 | 7/2002 | Nakai |
| 2004/0143852 | A1 | 7/2004 | Meyers |
| 2005/0137015 | A1 | 6/2005 | Rogers et al. |
| 2006/0121990 | A1 | 6/2006 | O'Kelley et al. |
| 2006/0148545 | A1 | 7/2006 | Rhyne et al. |
| 2008/0146338 | A1 | 6/2008 | Bernard et al. |
| 2008/0229215 | A1 | 9/2008 | Baron et al. |
| 2008/0261697 | A1 | 10/2008 | Chatani |
| 2008/0318687 | A1 | 12/2008 | Backer et al. |
| 2009/0088233 | A1 | 4/2009 | O'Rourke et al. |
| 2009/0111576 | A1 | 4/2009 | Ostergren et al. |
| 2009/0118015 | A1 | 5/2009 | Chang et al. |
| 2009/0253512 | A1 | 10/2009 | Nickell et al. |
| 2009/0309891 | A1 | 12/2009 | Karkanias et al. |
| 2010/0035692 | A1 | 2/2010 | Reville et al. |
| 2010/0064307 | A1 | 3/2010 | Malhotra et al. |
| 2010/0081504 | A1 | 4/2010 | Fujisawa |
| 2010/0113148 | A1 | 5/2010 | Haltovsky et al. |
| 2010/0227682 | A1 | 9/2010 | Reville et al. |
| 2010/0229235 | A1 | 9/2010 | Dawson et al. |
| 2010/0251141 | A1 | 9/2010 | Sabin et al. |
| 2010/0262958 | A1 | 10/2010 | Clinton et al. |
| 2010/0321389 | A1 | 12/2010 | Gay et al. |
| 2011/0178978 | A1 * | 7/2011 | Parunak et al. ............ 706/52 |
| 2011/0219422 | A1 | 9/2011 | Shen et al. |
| 2011/0244954 | A1 * | 10/2011 | Goldman et al. ............ 463/30 |
| 2011/0298827 | A1 * | 12/2011 | Perez ............ 345/647 |
| 2012/0009998 | A1 | 1/2012 | Bae et al. |
| 2012/0021825 | A1 * | 1/2012 | Harp et al. ............ 463/30 |
| 2012/0030249 | A1 * | 2/2012 | Schrag et al. ............ 707/803 |
| 2012/0050286 | A1 * | 3/2012 | Yockey ............ 345/420 |
| 2012/0054337 | A1 | 3/2012 | Moritz et al. |
| 2012/0110099 | A1 * | 5/2012 | Fujihara et al. ............ 709/206 |
| 2012/0151060 | A1 * | 6/2012 | Dawson et al. ............ 709/225 |
| 2012/0172131 | A1 * | 7/2012 | Boswell et al. ............ 463/42 |
| 2012/0233076 | A1 | 9/2012 | Sutcliffe et al. |
| 2012/0264509 | A1 | 10/2012 | Bortnik et al. |
| 2012/0289328 | A1 * | 11/2012 | Harp et al. ............ 463/31 |
| 2012/0302350 | A1 | 11/2012 | Murphy et al. |
| 2013/0203509 | A1 | 8/2013 | Reed |

FOREIGN PATENT DOCUMENTS

| | | |
|---|---|---|
| JP | 2010009512 | 1/2010 |
| KR | 1020050051985 | 6/2005 |
| KR | 20060074951 | 7/2006 |
| KR | 20090003544 | 1/2009 |
| KR | 1020090076319 | 7/2009 |

OTHER PUBLICATIONS

De Chiara, Rosario et al., "Real Positioning in Virtual Environments Using Game Engines", *Eurographics Italian Chapter Conference 2006*, retrieved from <http://citeseerx.ist.psu.edu/viewdoc/download?doi=10.1.1.66.7024&rep=rep1&type=pdf> on Nov. 15, 2011,(2007), 6 pages.

"PCT Search Report and Written Opinion", Application No. PCT/US2012/039766, (Dec. 20, 2012), 9 pages.

"PCT Search Report and Written Opinion", Application No. PCT/US2012/039769, (Jan. 2, 2013), 9 pages.

"Non-Final Office Action", U.S. Appl. No. 13/117,522, (Aug. 22, 2013), 12 pages.

"PCT Search Report and Written Opinion", Application No. PCT/US2013/024535, (May 3, 2013), 10 pages.

Lin, Yow-Jian et al., "Sync-MS: Synchronized Messaging Service for Real-Time Multi-Player Distributed Games", *In Proceedings of ICNP 2002*, Available at <http://www.bell-labs.com/user/kguo/papers/syncms-icnp02.pdf>,(Nov. 2002), 10 pages.

Nguyen, C.D "On the Provision of Immersive Audio Communication to Massively Multi-player Online Games", *In Proceedings of ISCC 2004*, Available at <http://ro.uow.edu.au/cgi/viewcontent.cgi?article=1183&context=infopapers&sei-redir=1#search=%22hearing+voice+and+avatars+and+multi+playe+gaming%22>, (Jul. 2004), 8 pages.

Lim, et al., "Responses to interactive game characters controlled by a computer versus other players", Retrieved at <<http://www.stanford.edu/~reeves/Byron__Reeves/Home__files/Agent%20Avatar%20Physio%20Responses.pdf>>, 2007, pp. 31.

Bennerstedt, Ulrika, "Avatars & interaction in gaming: Dysfunctional Interaction or a Practice of Players", Retrieved at <<http://www.learnit.org.gu.se/digitalAssets/889/889141__bennerstedt.pdf>>, Jun. 2007, pp. 1-14.

Knutsson, et al., "Peer-to-Peer Support for Massively Multiplayer Games", Retrieved at <<http://citeseerx.ist.psu.edu/viewdoc/download?doi=10.1.1.1.3588&rep=rep1&type=pdf>>, Proceedings of Twenty-third AnnualJoint Conference of the IEEE Computer and Communications Societies, Mar. 2004, pp. 12.

Logan, et al., "Keeping in Touch: Agents Reporting from Collaborative Virtual Environments", Retrieved at <<http://citeseerx.ist.psu.edu/viewdoc/download;jsessionid=037A64C295DD3C1FB7B7DF88D0B5D864?doi=10.1.1.104.1879&rep=rep1&type=pdf>>, Artificial Intelligence and Interactive Entertainment: Papers from the AAAI Symposium, 2002, pp. 62-67.

"In-Game support for non-added games.", Retrieved at <<http://raptr.com/forums/showthread.php?t=13094>>, Retrieved Date: Mar. 30, 2011, pp. 2.

"Non-Final Office Action", U.S. Appl. No. 13/117,522, Jan. 16, 2014, 11 pages.

"Final Office Action", U.S. Appl. No. 13/117,522, Jun. 20, 2014, 10 pages.

"Final Office Action", U.S. Appl. No. 13/366,046, May 21, 2014, 14 pages.

* cited by examiner

AVATARS OF FRIENDS AS NON-PLAYER-CHARACTERS

BACKGROUND

Online gaming services allow users to play games by themselves, or to play games together with one or more of their friends. While playing games together with friends is very enjoyable for many users, it is not without its problems. One such problem is that it can be a cumbersome process to select which friends a user is going to play a game with, oftentimes involving one or more menus through which the user navigates in order to select friends to play a game with. Such cumbersome processes can be frustrating for users, reducing the user friendliness of the games.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, for a particular user one or more other users associated with that particular user are identified based on a social graph of that particular user. An avatar of at least one of the other users is obtained and included as a non-player-character in a game being played by the particular user.

In accordance with one or more aspects, in a game being played by a first user, an avatar of a second user is included as a non-player-character. A user request is received from the first user to interact or communicate with the avatar of the second user. The user request is an invitation for the second user to join in a game with the first user, an indication of which is presented to the second user.

BRIEF DESCRIPTION OF THE DRAWINGS

The same numbers are used throughout the drawings to reference like features.

DETAILED DESCRIPTION

Avatars of friends as non-player-characters are discussed herein. For a particular user of a gaming service, other users in a social graph of that particular user (e.g., friends of that particular user, friends of that particular user's friends, etc.) are identified. Avatars of these other users are included as non-player-characters in the game being played by the particular user. Although the other users are not actually playing in that user's game, that user sees the avatars of the other users as non-player-characters (e.g., in a crowd cheering that particular user on). The particular user can also provide inputs to interact with one of the avatars of these other users to request that the user whose avatar is being interacted with join that user in a game. The interaction can take various forms, such as audibly calling the other user's name, tapping the shoulder of the other user's avatar, and so forth. That user and the user whose avatar is being interacted with can then join in playing a game together.

Figure 1:
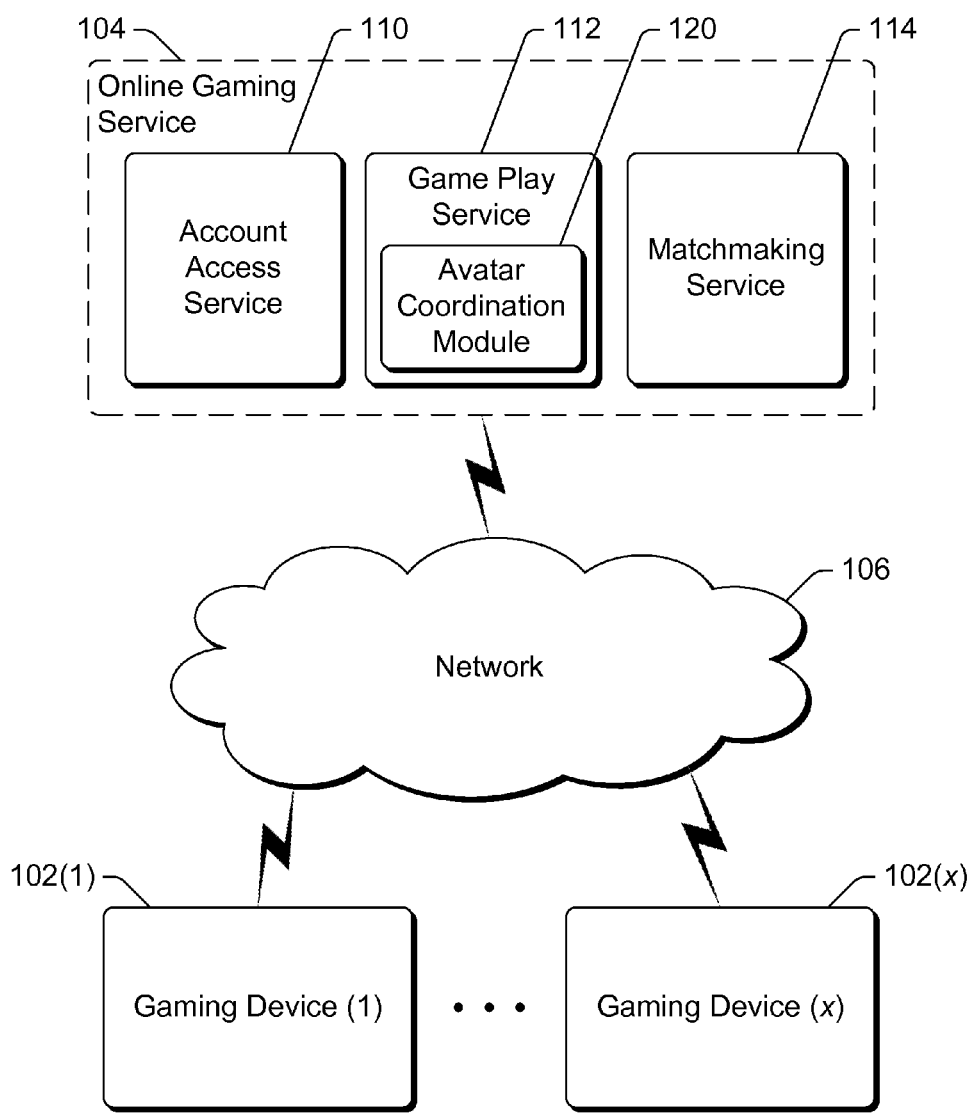
FIG. 1 illustrates an example system implementing the avatars of friends as non-player-characters in accordance with one or more embodiments.

FIG. 1 illustrates an example system 100 implementing the avatars of friends as non-player-characters in accordance with one or more embodiments. System 100 includes multiple (x) gaming devices 102 and an online gaming service 104 that can communicate with one another via a network 106. Network 106 can be a variety of different networks, including the Internet, a local area network (LAN), a wide area network (WAN), a personal area network (PAN), a phone network, an intranet, other public and/or proprietary networks, combinations thereof, and so forth.

Each gaming device 102 can be a variety of different types of devices that allow users to play games (such as sports games, strategy games, adventure games, simulation games, and so forth). Different ones of gaming devices 102 can be the same or different types of devices. For example, a gaming device 102 can be a game console, a cellular or other wireless phone, a television or other display device, a set-top box communicatively coupled to a display device, a desktop computer, a laptop or netbook computer, a tablet or notepad computer, a mobile station, an entertainment appliance, an automotive computer, and so forth.

Online gaming service 104 facilitates playing of one or more different games by users of gaming devices 102. Gaming service 104 is referred to as being an online service due to gaming devices 102 accessing service 104 (and/or other gaming devices 102) via network 106. Online gaming service 104 includes an account access service 110, a game play service 112, and optionally a matchmaking service 114, each of which can communicate with one another. Services 110, 112, and 114 can communicate with one another within online gaming service 104 and/or via gaming devices 102.

Account access service 110 provides various functionality supporting user accounts of online gaming service 104. Different users and/or gaming devices 102 typically have different accounts with online gaming service 104, and can log into their accounts via account access service 110. A user or gaming device 102 logs into an account providing credential information, such as an id (e.g., user name, email address, etc.) and password, a digital certificate or other data from a smartcard, and so forth. Account access service 110 verifies or authenticates the credential information, allowing a user or gaming device 102 to access the account if the credential information is verified or authenticated, and prohibiting the user or gaming device 102 from accessing the account if the credential information is not verified or is not authenticated. Once a user's credential information is authenticated, the user can use the other services provided by online gamine service 104. Account access service 110 can also provide various additional account management functionality, such as permitting changes to the credential information, establishing new accounts, removing accounts, and so forth.

Game play service 112 provides various functionality supporting playing of one or more different games by users of gaming devices 102. Different game titles can be supported by game play service 112 (e.g., one or more different sports game titles, one or more different strategy game titles, and so forth). A game title refers to a particular set of instructions that implement a game when executed (e.g., a set of instructions for a tennis game from a particular vendor, a set of instructions for a particular racing game from a particular vendor, etc). A particular running of a game title is also referred to as a game. Multiple games of the same game title can be played concurrently by different users, each game being a separate running of the game title. Games can be run and played as single-player games in which a single user of a gaming device 102 is playing the game and controlling one or more characters in the game, with other characters in the game being controlled by the game itself (these other characters also being referred to as non-player-characters). Games can also be run and played as multi-player games in which multiple users of one or more gaming devices 102 are playing the same game and each user is controlling one or more characters in the game. In multi-player games one or more additional characters can also be controlled by the game itself.

A game is typically run by executing one or more programs. The programs that are executed to run these games can be run on gaming devices 102 and/or game play service 112. Gaming devices 102 can execute one or more programs for the game, communicating with game play service 112 to facilitate communication between users of gaming devices 102 while playing games and/or to provide or obtain additional data (and/or programs) for playing the game. Alternatively (or additionally), game play service 112 can execute one or more programs for the game, receiving inputs from users of gaming devices 102 and returning data indicating outputs to be generated for display or other presentation to the users of gaming devices 102.

In one or more embodiments, games are programs executed on gaming devices 102 and game play service 112 manages communication between different gaming devices 102. In other embodiments, games are programs executed on gaming devices 102 and game play service 112 facilitates establishing communication between different gaming devices 102. After communication between two gaming devices 102 is established, communication can be made between those two gaming devices 102 without involving game play service 112.

Game play service 112 includes an avatar coordination module 120. While playing a game, there is an object in the game that represents the user, referred to as an avatar. An avatar is oftentimes a graphical representation of the user, but can alternatively have a variety of other forms, such as a vehicle, an orb, and so forth. Avatar coordination module 120 facilitates sharing of avatars of different users across one or more games and/or communication between avatars across one or more games. Avatars can be shared across different game titles as well as across different games of the same game title. Similarly, communication between avatars can occur across different game titles as well as across different games of the same game title. Additionally, the avatar of a user can be shared while the user is logged in to online gaming service 110 and/or when the user is not logged into online gaming service 110. This sharing of avatars is discussed in more detail below. Although illustrated as being included as part of game play service 112, avatar coordination module 120 can alternatively be implemented at least in part in gaming devices 102.

Matchmaking service 114, when included in online gaming service 104, provides various functionality facilitating the finding of other users with which a user of gaming device 102 can play a game. Matchmaking service 114 identifies other users with which a particular user can play a game in a variety of different manners, such as based on physical locations of the gaming devices 102, skill levels of the users of gaming devices 102, and/or other characteristics of gaming devices 102 and/or the users of gaming devices 102. Matchmaking service 114 can identify other users based on user accounts that account access service 110 is aware of, based on users logged into their accounts at a particular time (e.g., as indicated by account access service 110), based on accounts from other services (e.g., social networking services that matchmaking service 114 can communicate with), and so forth. Matchmaking service 114 can identify other users with which a user of gaming device 102 can play a game across the same and/or different types of gaming devices 102 (e.g., one or more users of a desktop computer and one or more users of a game console, one or more users of a phone and one or more users of a game console, etc.). Similarly, matchmaking service 114 can identify other users with which a user of gaming device 102 can play a game across the same and/or different services (e.g., one or more users of game play service 112 and one or more users of another service of online gaming service 104). Avatar coordination module 120 can also facilitate the finding of other users with which a user of gaming device 102 can play a game based on social graphs of the users as discussed in more detail below. Any finding of other users by matchmaking service 114 is in addition to avatar coordination module 120 finding other users.

Each of services 110, 112, and 114 can be implemented using one or more computing devices. Typically these computing devices are server computers, but any of a variety of different types of computing devices can alternatively be used (e.g., any of the types of devices discussed above with reference to gaming device 102). Each of services 110, 112, and 114 can be implemented using different computing devices, or alternatively one or more of services 110, 112, and 114 can be implemented using the same computing device.

Additionally, although services 110, 112, and 114 are illustrated as separate services, alternatively one or more of these services can be implemented as a single service. For example, game play service 112 and matchmaking service 114 can be implemented as a single service. Furthermore, the functionality of one or more of services 110, 112, and 114 can be separated into multiple services. In addition, the functionality of online gaming service 104 can be separated into multiple services. For example, online gaming service 104 may include account access service 110 and game play service 112, and a different service (e.g., a social networking service) can include matchmaking service 114.

Figure 2:
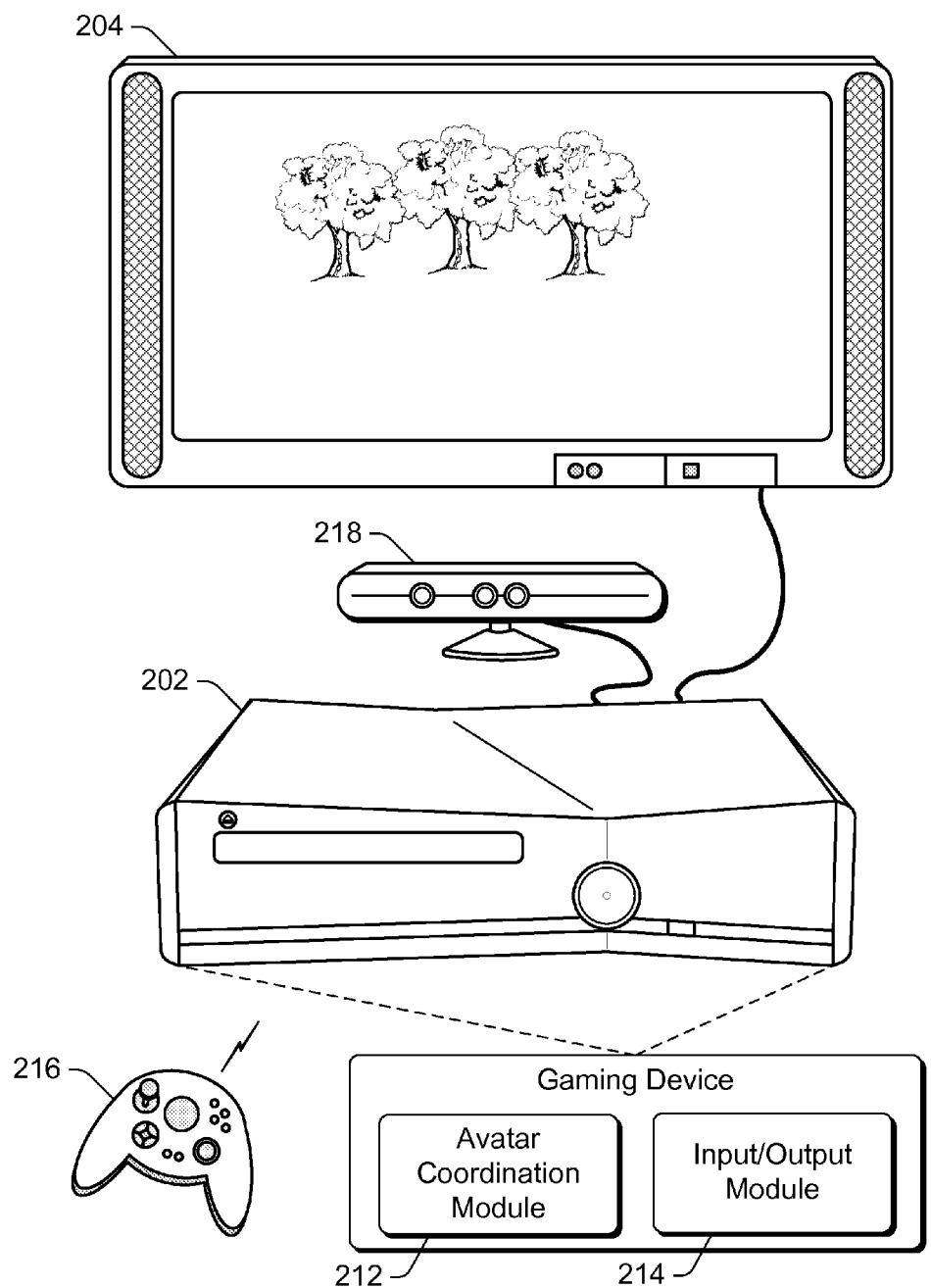
FIG. 2 illustrates an example gaming device and display in additional detail in accordance with one or more embodiments.

FIG. 2 illustrates an example gaming device and display in additional detail in accordance with one or more embodiments. FIG. 2 illustrates a gaming device 202, which can be a gaming device 102 of FIG. 1, coupled to a display device 204 (e.g., a television). Gaming device 202 and display device 204 can communicate via a wired and/or wireless connection. Gaming device 202 includes an avatar coordination module 212 and an input/output (I/O) module 214. Avatar coordination module 212 is analogous to avatar coordination module 120 of FIG. 1, although is illustrated as implemented in gaming device 202 rather than in an online gaming service.

Input/output module 214 provides functionality relating to recognition of inputs and/or provision of (e.g., display or other presentation of) outputs by gaming device 202. For example, input/output module 214 can be configured to receive inputs from a keyboard or mouse, to identify gestures and cause operations to be performed that correspond to the gestures, and so forth. The inputs can be detected by input/output module 214 in a variety of different ways.

Input/output module 214 can be configured to receive one or more inputs via touch interaction with a hardware device, such as a controller 216 as illustrated. Touch interaction may involve pressing a button, moving a joystick, movement across a track pad, use of a touch screen of display device 204 or controller 216 (e.g., detection of a finger of a user's hand or a stylus), other physical inputs recognized by a motion detection component (e.g., shaking a device, rotating a device, etc.), and so forth. Recognition of the touch inputs can be leveraged by input/output module 214 to interact with a user interface output by gaming device 202, such as to interact with a game, change one or more settings of gaming device 202, and so forth. A variety of other hardware devices are also contemplated that involve touch interaction with the device. Examples of such hardware devices include a cursor control device (e.g., a mouse), a remote control (e.g., a television remote control), a mobile communication device (e.g., a wireless phone configured to control one or more operations of gaming device 202), and other devices that involve touch on the part of a user or object.

Input/output module 214 can also be configured to receive one or more inputs in other manners that do not involve touch or physical contact. For example, input/output module 214 can be configured to receive audio inputs through use of a microphone (e.g., included as part of or coupled to gaming device 202). By way of another example, input/output module 214 can be configured to recognize gestures, presented objects, images, and so forth through the use of a camera 218. The images can also be leveraged by gaming device 202 to provide a variety of other functionality, such as techniques to identify particular users (e.g., through facial recognition), objects, and so on.

Gaming device 202 can also leverage camera 218 to perform skeletal mapping along with feature extraction of particular points of a human body (e.g., 48 skeletal points) to track one or more users (e.g., four users simultaneously) to perform motion analysis. For instance, camera 218 can capture images that are analyzed by input/output module 214 or a game running on gaming device 202 to recognize one or more motions made by a user, including what body part is used to make the motion as well as which user made the motion. The motions can be identified as gestures by input/output module 214 or the running game to initiate a corresponding operation.

Figure 3:
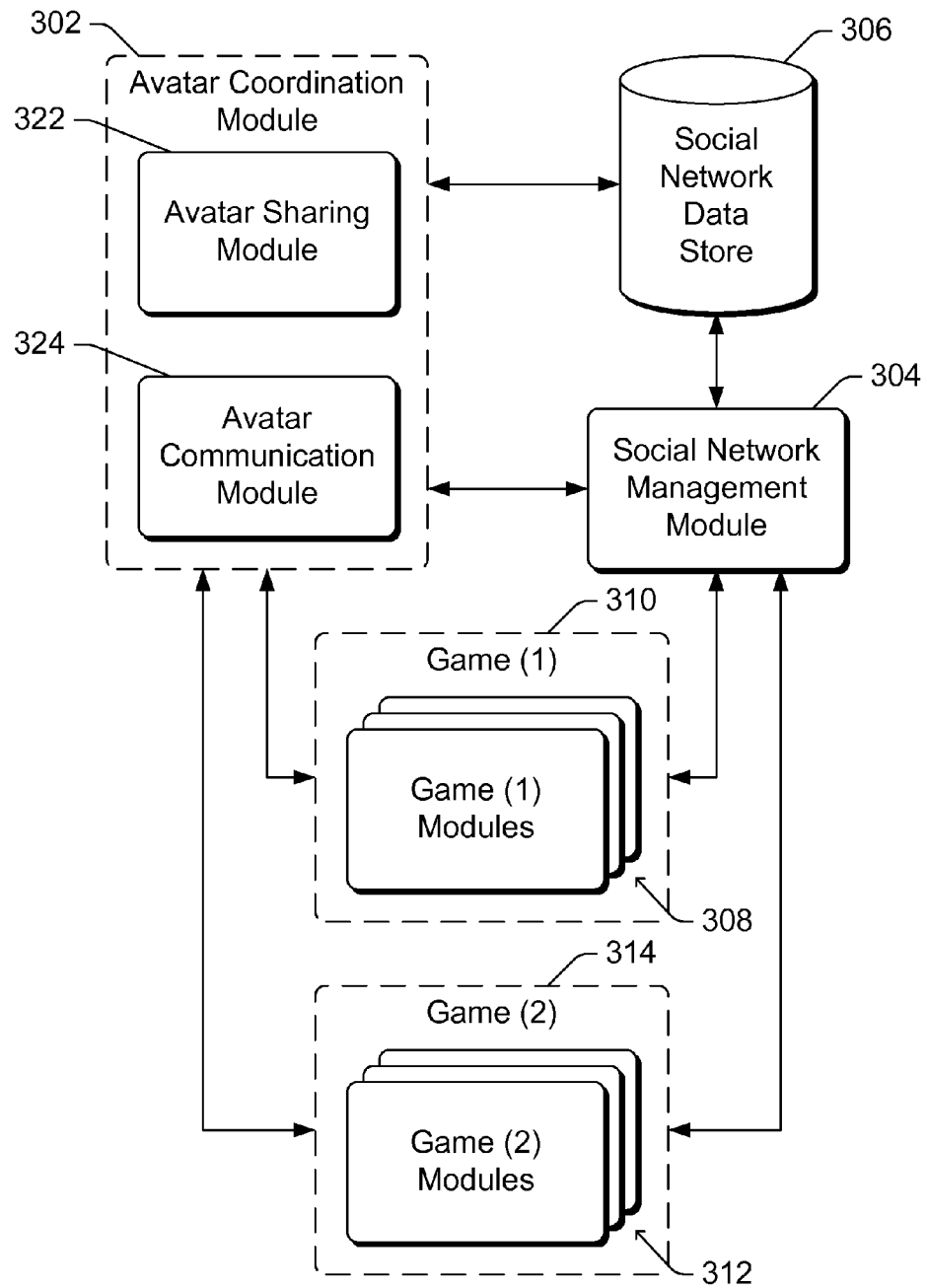
FIG. 3 illustrates another example system implementing the avatars of friends as non-player-characters in accordance with one or more embodiments.

FIG. 3 illustrates an example system 300 implementing the avatars of friends as non-player-characters in accordance with one or more embodiments. System 300 includes an avatar coordination module 302 (which can be an avatar coordination module 120 of FIG. 1 or an avatar coordination module 212 of FIG. 2), a social network management module 304, a social network data store 306, one or more game modules 308 of a game 310, and one or more game modules 312 of a game 314.

Social network management module 304 manages social network data for users of system 300 (e.g., users having accounts with online gaming service 104 of FIG. 1), including identifying other users in a user's social graph. Different social network data is maintained in social network data store 306 for different users of system 300. For each user of system 300, a record is maintained of the friends of that user. Friends can take a variety of different forms, such as personal acquaintances, work acquaintances, family members, and so forth. Social network management module 304 allows users to identify other users as friends and stores an indication of those friends for each user in data store 306. A user can identify a particular user that is a friend in different manners, such as by entering a user name or account identifier for the particular user, selecting the particular user from a list, and so forth. Another user can optionally be indicated as a friend of a particular user only if that other user confirms that he or she desires to be a friend of that particular user. Friends of a particular user can also be identified in other manners, such as by accessing a social networking service (e.g., external to online gaming service 104 of FIG. 1), receiving indications of friends from other components or modules, and so forth.

The social graph of a user refers to friends of that user, and optionally one or more additional levels or steps of friends. Each level or step refers to a group of friends of each user in the previous level or step. For example, the first level or step is friends of the user, the second level or step is friends of the user's friends, the third level or step is friends of the friends of the user's friends, and so forth. Thus, the social graph for a particular user can include other users known to that particular user, as well as optionally additional users (e.g., a friend of a friend). The users in a social graph of a particular user are also referred to as being associated with that particular user. Social network management module 304 allows the social graphs of users to be made available to avatar coordination module 302, and optionally to other modules or programs (e.g., to one or more games).

Game modules 308 are modules of a game 310, and game modules 312 are modules of a game 314. In the illustrated example, games 310 and 314 are games being played by different users. Games 310 and 314 can be different game titles (e.g., one can be a sports game and another an adventure game), or alternatively can be different games of the same game title.

Avatar coordination module 302 includes an avatar sharing module 322 and an avatar communication module 324. Avatar sharing module 322 provides functionality allowing, for a particular user, avatars of other users to be displayed in a game that particular user is playing. Which other users' avatars can be displayed in the game that particular user is playing is based at least in part on the data in social network data store 306, as discussed in more detail below. Avatar communication module 324 provides functionality allowing communication between avatars of different users across different game titles and/or different games of the same game title.

An avatar is an object representing a user (and/or controlled by a user) in a game. An avatar is oftentimes a graphical representation of a user, having the appearance of a person and may include similar characteristics as the user (e.g., hair color, height, weight, etc.) or alternatively different characteristics. Alternatively, an avatar can be other objects other than a person, such as a vehicle (e.g., a car or a spaceship), a geometric shape (e.g., an orb), and so forth. Each user has his or her own avatar, and different users' avatars can have different characteristics.

System 300 can be implemented in a variety of different devices. For example, system 300 can be implemented in gaming devices 102 of FIG. 1, in online gaming service 104 of FIG. 1, or partly in gaming devices 102 and partly in online gaming service 104.

In one or more embodiments avatar coordination module 302 is implemented separately from, and as part of a service made available to, games 310 and 314. Alternatively, avatar coordination module 302 can be implemented (at least in part) in games 310 and 314. Thus, for example, modules 308 can include avatar sharing module 322 and/or avatar communication module 324, or can implement at least part of the functionality discussed herein as performed by avatar sharing module 322 and/or avatar communication module 324. Similarly, by way of example, modules 312 can include avatar sharing module 322 and/or avatar communication module 324, or can implement at least part of the functionality discussed herein as performed by avatar sharing module 322 and/or avatar communication module 324.

Avatar sharing module 322 allows, for a particular user, avatars of other users to be displayed in a game 310 that particular user is playing. FIG. 3 is discussed with reference to the particular user playing game 310, although the techniques discussed herein apply to users of game 314 as well as other games. The other users whose avatars are to be displayed are determined based on the social graph of the particular user. The number of levels or steps included in the social graph can vary, and can be determined based on the particular user. For example, the particular user can set a configuration value indicating how many levels or steps are to be included in his or her social graph.

Avatar sharing module 322 obtains the social graph of the particular user (e.g., from social network management module 304) and provides the avatars (or an indication of the avatars) of the users to be displayed to a module 308 of game 310. The avatars of users can be maintained in a data store accessible to avatar sharing module 322, such as social network data store 306 or another store. Avatar sharing module 322 can obtain the avatars of the users to be displayed and provide those avatars to a module 308. Alternatively, avatar sharing module 322 can provide to a module 308 identifiers of the users whose avatars are to be displayed, and game 310 itself can in turn obtain the avatars of the identified users.

Game 310 then displays the avatars of those users as non-player-characters (NPCs) in game 310. A non-player-character refers to a character whose actions are controlled by the game rather than by a user. A non-player-character typically performs various actions in the game, such as assisting the user's avatar in battles, interacting with the user's avatar to assist the user in the game, fighting or racing against the user, cheering for (or against) the user, and so forth. Thus, rather than displaying non-player-characters with characteristics that are generated or selected randomly or according to some other rules or criteria, game 310 displays at least some non-player-characters as the avatars selected based on the particular user's social graph (e.g., the non-player-characters of the particular user's friends). The avatars can be selected in different manners, such as selected randomly (or pseudo randomly) from the particular user's social graph, selected based on when the avatar was most recently selected relative to other avatars, selected according to different rules or criteria, and so forth.

Game 310 displays these avatars in the same manner and performing the same actions as other non-player-characters would be displayed. For example, the avatars can be displayed as non-player-characters in a crowd cheering the particular user on, as non-player-characters competing against the particular user in a race, as non-player-characters encountered as the particular user explores a virtual world, as non-player-characters sitting in a lounge at the end of a level, as non-player-characters in a drop zone or loading zone, as non-player-characters parachuting from the sky, and so forth. By way of another example, in one or more embodiments, game 310 allows a user to race against a ghost avatar. A ghost avatar is oftentimes an image of the user's avatar following a path that the user took during a previous playing of the game (e.g., a particular path taken by the user during a previous playing of the game). In such embodiments, rather than being an image of the user's avatar, the ghost avatar can be an avatar selected based on the particular user's social graph. Thus, rather than the user's avatar racing against a ghost image of the user's avatar, the user's avatar can be racing against a ghost image of an avatar of another user in the user's social graph (which is following a path that the user took during a previous playing of the game).

It should be noted that, for the users whose avatars are displayed as non-player-characters in game 310, those users need not be (but can be) playing another game of that same game title. Those users need not have ever (but can have) played game 310 before, and need not ever (but can) play game 310 in the future. Furthermore, those users need not (but can) be online (e.g., need not be logged into online gaming service 104). Despite not playing game 310 and/or not being online, avatars of those users are still displayed as non-player-characters in game 310 due to the users being in the social graph of the particular user playing game 310.

In other embodiments, the avatars displayed as non-player-characters in a game being played by a particular user are displayed in a manner dependent on the way in which the users whose avatars are displayed as non-player-characters played that game. These users can have played the game previous to the game currently being played by the particular user, and/or can be playing the game concurrently with the game currently being played by the particular user. The manner in which avatars are displayed can vary, including the locations at which avatars are displayed and/or whether avatars are displayed as being alive or dead.

In situations in which the avatars are displayed as non-player-characters in a manner dependent on the way the users played the game, the manner in which the avatars are displayed as non-player-characters can be tracked by one or more modules of the game. For example, while one user, user A, is playing a game 310, a module 308 can maintain a record of a location where particular events occur (e.g., each time the user's avatar dies). This record can be stored in social network data store 306, or alternatively can be stored elsewhere. When another user, user B, is playing game 314 and user A is included in the social graph of user B, a module 312 monitors the location of the avatar of user B in the game. When the location of the avatar of user B in the game is the same as (e.g., within a threshold distance of) the location where the avatar of user A was when the event occurred, the avatar of user B can be displayed along with an indication of the event that occurred. For example, if the avatar of user A died at a particular location, then the dead avatar of user A can be displayed at that particular location. Furthermore, if multiple events occurred at a particular location, then the avatar of user A can be displayed multiple times. For example, if the avatar of user A died several times at a particular location, then several dead avatars of user A (multiple copies of the same avatar, optionally in different poses) can be displayed at that particular location.

Furthermore, in one or more embodiments the avatars of users in a social graph of a particular user that are displayed as non-player-characters in game 310 can be leveraged to allow those users to join in a game with the particular user. Optionally, the avatars of users that are displayed as non-player-characters can be displayed in a manner to indicate which users whose avatars are displayed as non-player-characters are currently online (e.g., logged into online gaming service 104 of FIG. 1, which is the same online gaming service as the particular user). For example, only avatars of users that are currently online can be displayed as non-player-characters. By way of another example, the appearance of the avatars can be modified to indicate whether the user whose avatar is displayed is currently online (e.g., the avatar of a user that is currently online can be displayed larger than an avatar of a user that is not currently online, avatars of users that are currently online can be displayed as glowing or highlighted in some manner, etc.).

The particular user can interact or communicate with the avatar of a user displayed as a non-player-character in various manners to invite that user to join in a game with the particular user. Avatar communication module 324 facilitates this interaction or communication, passing data for the interaction or communication between the games being played by (and/or other programs being used by) the users. The interaction or communication can take various forms. For example, the communication can be an audible call, such as the particular user audibly calling out another users' name. By way of another example, the interaction can be a "physical" interaction between the avatars, such as the particular user controlling his or her avatar to tap another user's avatar on the shoulder, the particular user controlling his or her avatar to give another user's avatar a high-five, and so forth. In response to this interaction or communication, the two users can be automatically joined in a game, or alternatively the particular user and the other user can be joined in a game in response to the other user accepting the invitation (e.g., by having his or her avatar return the high-five, by having his or her avatar shake the hand of the particular user's avatar, and so forth).

For example, assume user A and user B are both online (e.g., logged into a same online gaming service, such as online gaming service 104 of FIG. 1), that user B is in the social graph of user A, and user B's avatar is displayed as a non-player-character in user A's game. User A can invite user B to join in a game with user A by calling out user B's name. The audible data of user A calling out user B's name is recorded at user A's gaming device and played back at user B's gaming device. Thus, while playing a different game title (or a different game of the same game title that user A is playing), user B hears user A calling user B's name. User B can then optionally take some action (such as calling out user A's name, pressing a particular key sequence, etc.) to accept the invitation, in response to which user A and user B join in the same game. Thus, user A can invite user B to join a game based on the presence of user B's avatar as a non-player-character in user A's game.

By way of another example, again assume that user A and user B are both online (e.g., logged into a same online gaming service, such as online gaming service 104 of FIG. 1), that user B is in the social graph of user A, and user B's avatar is displayed as a non-player-character in user A's game. User A can invite user B to join in a game with user A by controlling user A's avatar to tap user B's avatar on the shoulder. An indication of the invitation is presented at user B's gaming device. The indication of the invitation can be presented in different manners, such as user A's avatar (e.g., obtained from avatar sharing module 322) being displayed as a non-player-character in user B's game along with a dialog box requesting that user B join user A in a game, user A's avatar being displayed as a non-player-character in user B's game that audibly speaks a request that user B join user A in a game, user A's avatar being displayed as a non-player-character in user B's game performing a gesture indicating an invitation to join a game (e.g., user A's avatar tapping user B's avatar on the shoulder or giving user B a high-five), and so forth. User B can then optionally take some action (such as calling out user A's name, pressing a particular key, controlling user B's avatar to tap user A's avatar on the shoulder, etc.) to accept the invitation, in response to which user A and user B join in the same game.

The presentation of particular data (e.g., playing back of audible data, displaying a request to join a game, etc.) can be managed by avatar communication module 324 and/or a module of the game being played by (or other program being used by) the users. For example, if user A calls out the name of user B, the audible data of this call-out can be received by avatar communication module 324, and avatar communication module 324 can play the audible data back on the gaming device being used by user B. By way of another example, if user A calls out the name of user B, the audible data of this call out can be provided by the game being played by user A to avatar communication module 324, which in turn provides the audible data to the game being played by (or other program being used by) user B. This game being played by (or other program being used by) user B can then play back the audible data on the gaming device being used by user B.

When one user invites another user to join in a game, the two users can be automatically joined in the same game, or alternatively the users can be joined in the same game after receiving an acceptance of the invitation from the invitee. The invitee can join the game being played by the inviter, the inviter can join the game being played by the invitee, or alternatively a new game can be created that both the inviter and the invitee join. Additionally, the two users can join the game immediately (e.g., with a threshold amount of time, such as 10-30 seconds), which can result in one or both of the users' games being terminated (e.g., a user's game may be stopped mid-level). Alternatively, the two users can join the game after both reach an appropriate stopping or pausing point in their respective games. The nature of an appropriate stopping or pausing point can vary by game. For example, the two users can join the game when both have completed a level of their respective games, when both have stopped at a checkpoint of their respective games, and so forth.

When it is determined that two users are to join the same game, the management and game play of the game that both users have joined can be coordinated by online gaming service 104 of FIG. 1 (e.g., game play service 112) and/or the games being played by those users (e.g., games 310 and 312 of FIG. 3). Multiple users playing the same game can be managed in a variety of different conventional manners.

It should be noted that although one user may communicate with or interact with the avatar of another user to have that other user join the user in a game, the avatar of that other user is a non-player-character in the game being played by the one user. The avatar is not being controlled by that other user in the game being played by the one user. That other user also need not be playing the same game as the one user in order to be invited to join in a game; rather, that other user can be playing a different game and still receive the invitation to join the particular user in a game.

Additionally, it should be noted that although various discussions herein discuss two users joining a game, the avatars of friends as non-player-characters techniques discussed herein can be used to allow any number of users to join a game. For example, a particular user may call out the names of five of his or her friends to invite all five to join the game along with the particular user.

Furthermore, in one more embodiments an avatar of a particular user is displayed as a non-player-character in another user's game only after receiving the consent of the particular user to do so. This user consent can be an opt-in consent, where the user takes an affirmative action (e.g., selection of a radio button, menu item, etc.) to request that his or her avatar be used as a non-player-character in games of other users. Alternatively, this user consent can be an opt-out consent, where the user takes an affirmative action (e.g., selection of a radio button, menu item, etc.) to request that his or her avatar not be used as a non-player-character in games of other users. If the user does not choose to opt out of having his or her avatar used as a non-player-character in games of other users, then it is an implied consent by the user to allow his or her avatar to be used as a non-player-character in games of other users.

Figure 4:
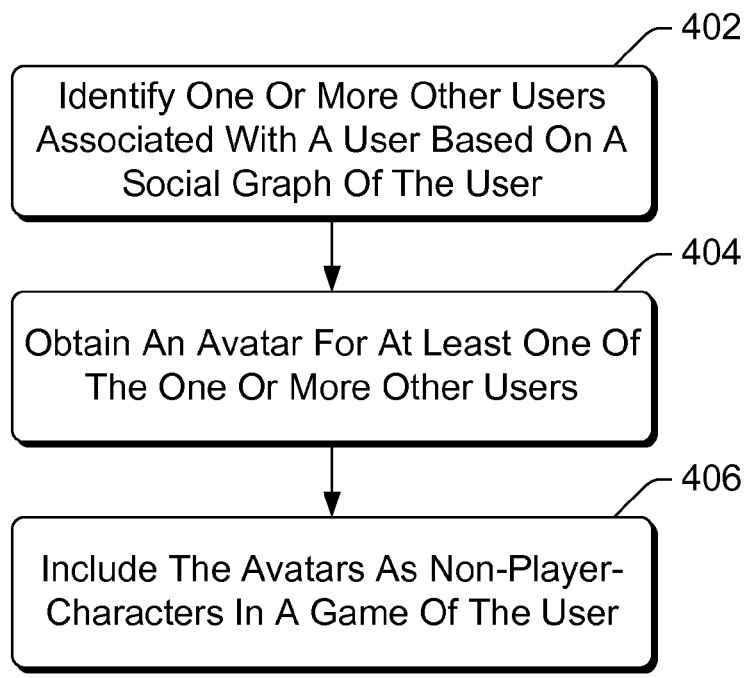
FIG. 4 is a flowchart illustrating an example process for implementing the avatars of friends as non-player-characters in accordance with one or more embodiments.

FIG. 4 is a flowchart illustrating an example process 400 for implementing the avatars of friends as non-player-characters in accordance with one or more embodiments. Process 400 is carried out by a system, such as system 300 of FIG. 3, and can be implemented in software, firmware, hardware, or combinations thereof. Process 400 is shown as a set of acts and is not limited to the order shown for performing the operations of the various acts. Process 400 is an example process for implementing the avatars of friends as non-player-characters; additional discussions of implementing the avatars of friends as non-player-characters are included herein with reference to different figures.

In process 400, one or more other users associated with a user are identified based on a social graph of the user (act 402). This social graph can include any number of steps or levels as discussed above.

For at least one of the one or more other users identified in act 402, an avatar of the other user is obtained (act 404). Avatars for each of the one or more other users can be obtained, or alternatively avatars of only selected ones of the one or more other users can be obtained (e.g., avatars of ones of the other users that are online, a threshold number of avatars (e.g., five avatars, 20% of the number of other users identified in act 402, etc.)).

The avatars obtained in act 404 are included as non-player-characters in a game being played by the user (act 406). These non-player-characters can take various actions in the game as discussed above. Additionally, the user can interact or communicate with a non-player-character to invite the user whose avatar is displayed as the non-player-character to join a game with the user as discussed above.

Figure 5:
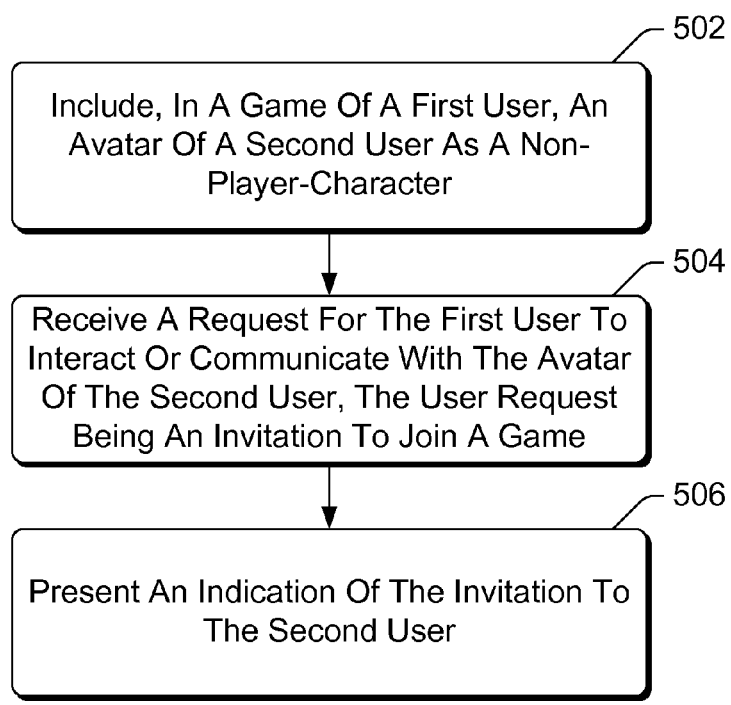
FIG. 5 is a flowchart illustrating an example process for allowing a user to invite another user to join a game in accordance with one or more embodiments.

FIG. 5 is a flowchart illustrating an example process 500 for allowing a user to invite another user to join a game in accordance with one or more embodiments. Process 500 is carried out by a system, such as system 300 of FIG. 3, and can be implemented in software, firmware, hardware, or combinations thereof. Process 500 is shown as a set of acts and is not limited to the order shown for performing the operations of the various acts. Process 500 is an example process for allowing a user to invite another user to join a game; additional discussions of allowing a user to invite another user to join a game are included herein with reference to different figures.

In process 500, in a game being played by a first user, an avatar of a second user is included as a non-player-character (act 502). These non-player-characters can take various actions in the game as discussed above. The second user is included in a social graph of the first user as discussed above.

A request of the first user to interact or communicate with the avatar of the second user is received (act 504). The request is an invitation or request for the second user to join in a game with the first user as discussed above. The interaction or communication can take various different forms as discussed above, such as an audible request, tapping an avatar on a shoulder, and so forth.

An indication of the invitation is presented to the second user (act 506). The indication of the invitation can be presented in different manners as discussed above, such as audible playback, performing a gesture of an avatar of the first user, and so forth.

Various actions such as communicating, receiving, storing, generating, obtaining, and so forth performed by various modules are discussed herein. It should be noted that the various modules can cause such actions to be performed. A particular module causing an action to be performed includes that particular module itself performing the action, or alternatively that particular module invoking or otherwise accessing another component or module that performs the action (or performs the action in conjunction with that particular module).

Thus, the avatars of friends as non-player-characters techniques discussed herein supports various usage scenarios. Users can play games with the non-player-characters being their friends (or friends of friends) rather than being other random characters. Furthermore, a user can interact or communicate (e.g., via the user's avatar) with an avatar of a non-player-character of another user to invite that other user to join the user in a game. Thus, rather than navigating through one or more menus in order to invite that other user to join the game, the user is able to invite that other user to join a game by simple interaction between the avatars (or communication with the other user's avatar).

Figure 6:
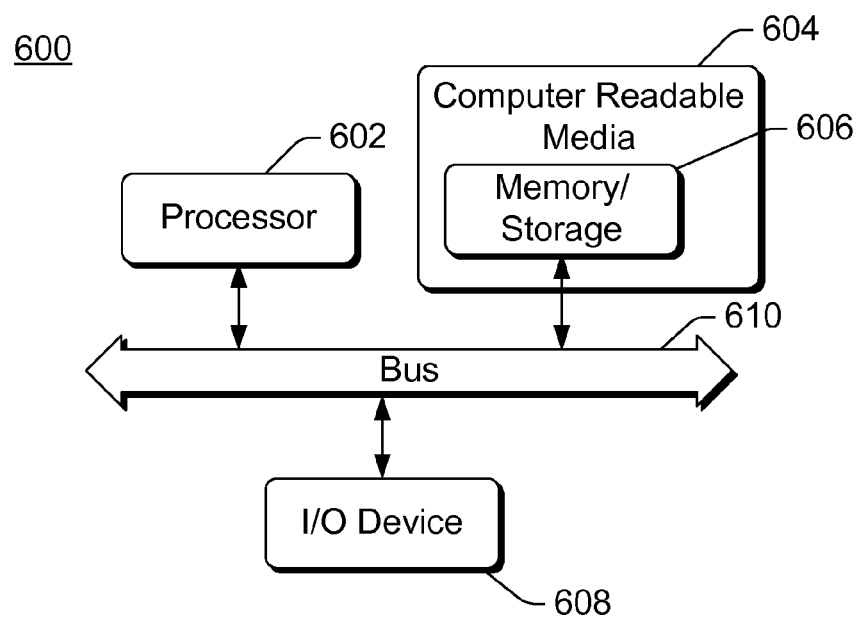
FIG. 6 illustrates an example computing device that can be configured to implement the avatars of friends as non-player-characters in accordance with one or more embodiments.

FIG. 6 illustrates an example computing device 600 that can be configured to implement the avatars of friends as non-player-characters in accordance with one or more embodiments. Computing device 600 can, for example, be a gaming device 102 of FIG. 1, implement at least part of online gaming service 104 of FIG. 1, be a gaming device 202 of FIG. 2, or implement at least part of system 300 of FIG. 3.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the avatars of friends as non-player-characters techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   identifying, based on a social graph of a first user, one or more other users associated with the first user;
   obtaining, for each of at least one of the one or more other users, an avatar of the other user;
   including, for each of the at least one of the one or more other users, the obtained avatar of the other user as a non-player-character in a game being played by the first user; and
   receiving a user request initiated by the first user to invite, by way of interaction between an avatar of the first user and the obtained avatar of a particular one of the one or more other users, the particular one user to join the game.

2. A method as recited in claim 1, the including comprising including each obtained avatar as a non-player-character cheering on the avatar of the first user in the game.

3. A method as recited in claim 1, the including comprising including the obtained avatar of one of the one or more other users as a ghost avatar following a path in the game that the first user took during a previous playing of the game.

4. A method as recited in claim 1, the including comprising including multiple copies of the obtained avatar of one of the one or more other users as a dead avatar at a location in the game where the obtained avatar died while the game was previously played by the one other user having the obtained avatar.

5. A method as recited in claim 1, the first user being logged into an online gaming service, and at least one of the one or more other users including a user that is not currently logged into the online gaming service.

6. A method as recited in claim 1, the including comprising displaying the obtained avatar of one of the other users as having a particular appearance if the other user is currently logged into a same online gaming service as the first user, and displaying the obtained avatar of the one of the other users as having a different appearance if the other user is not currently logged into the same online gaming service as the first user.

7. A method as recited in claim 1, the user request comprising an audible call.

8. A method as recited in claim 1, further comprising joining the first user and the particular one user in the game in response to the particular one user accepting the invitation.

9. A method comprising:
   including, as a non-player-character in a first game being played by a first user, an avatar of a second user identified based on a social graph of the first user;
   receiving a user request initiated by the first user to invite, by way of interaction between an avatar of the first user in the first game and the avatar of the second user in the first game, the second user to join in a game with the first user; and
   providing an indication of the invitation for presentation to the second user in a second game being played by the second user.

10. A method as recited in claim 9, the second game being a different game than the first game.

11. A method as recited in claim 9, the first game being a game of a first game title, the second game being a game of a different game title than the first game title.

12. A method as recited in claim 9, the including comprising including the avatar of the second user as a non-player-character in the first game only if the second user is logged into a same online gaming service as the first user.

13. A method as recited in claim 9, the including comprising displaying the avatar of the second user with an appearance indicating that the second user is logged into a same online gaming service as the first user.

14. A method as recited in claim 9, the second user being identified as one of multiple friends of the first user in the social graph.

15. A method as recited in claim 9, the user request comprising an audible input.

16. A method as recited in claim 9, further comprising joining the first user and the second user in a game in response to receiving an indication of acceptance of the invitation from the second user.

17. A method as recited in claim 16, the joining comprising joining the first user and the second user in the first game.

18. One or more computer storage media having stored thereon multiple instructions that, when executed by one or more processors, cause the one or more processors to:
- identify, based on a social graph of a first user, multiple other users associated with the first user;
- obtain, for each of at least one of the multiple other users, an avatar of the other user;
- include, for each of the at least one of the multiple other users, the obtained avatar of the other user as a non-player-character in a first game being played by the first user;
- receive a user request initiated by the first user to invite, by way of interaction between an avatar of the first user and an avatar of a second user, the second user to join in a game with the first user, the second user being one of the multiple other users; and
- provide an indication of the invitation for presentation to the second user while the second user is playing a game other than the first game.

19. One or more computer storage media as recited in claim 18, the instructions that cause the one or more processors to include the obtained avatar of the other user as a non-player-character in the first game including instructions that cause the one or more processors to include the obtained avatar of one of the multiple other users as having a particular appearance if the one of the multiple other users is currently logged into a same online gaming service as the first user, and include the obtained avatar of the one of the multiple other users as having a different appearance if the one of the multiple other users is not currently logged into the same online gaming service as the first user.

20. One or more computer storage media as recited in claim 18, the multiple instructions further causing the one or more processors to join the first user and the second user in the first game in response to the second user accepting the invitation.

* * * * *